US010360270B2

United States Patent
Takami

(10) Patent No.: US 10,360,270 B2
(45) Date of Patent: Jul. 23, 2019

(54) SERVER APPARATUS, TERMINAL APPARATUS, METHOD FOR INSERTING INFORMATION INTO WEB PAGE, INFORMATION INSERTION PROGRAM, AND RECORDING MEDIUM WITH PROGRAM RECORDED THEREIN

(75) Inventor: Shinya Takami, Shinagawa-ku (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 508 days.

(21) Appl. No.: 13/512,242

(22) PCT Filed: Nov. 18, 2010

(86) PCT No.: PCT/JP2010/070600
§ 371 (c)(1),
(2), (4) Date: May 25, 2012

(87) PCT Pub. No.: WO2011/065285
PCT Pub. Date: Jun. 3, 2011

(65) Prior Publication Data
US 2012/0272136 A1    Oct. 25, 2012

(30) Foreign Application Priority Data

Nov. 26, 2009 (JP) .................. 2009-268800
Nov. 26, 2009 (JP) .................. 2009-268803

(51) Int. Cl.
*G06F 17/00* (2019.01)
*G06F 16/9535* (2019.01)

(52) U.S. Cl.
CPC .. *G06F 16/9535* (2019.01); *G06F 2213/0038* (2013.01)

(58) Field of Classification Search
CPC ......... G06F 17/00; G06F 3/044; G06F 3/0485
(Continued)

(56) References Cited

U.S. PATENT DOCUMENTS 7,930,646 B2 * 4/2011 De Souza Sana .... G06F 3/0481
715/784
8,140,384 B2 * 3/2012 Almeida ................ G06Q 30/02
705/14.16
(Continued)

FOREIGN PATENT DOCUMENTS

JP    2001-349737 A    12/2001
JP    2002-207869 A    7/2002
(Continued)

OTHER PUBLICATIONS

Lazy Load, Lazy Load Plugin for jQuery, Jan. 1, 2008, appelsiini. net, pp. 1-2 (pdf).*

(Continued)

*Primary Examiner* — Manglesh M Patel
(74) *Attorney, Agent, or Firm* — Sughrue Mion, PLLC

(57) ABSTRACT

A server apparatus transmits a web page to a terminal apparatus through a network, and monitors user operation information for the web page displayed on the terminal apparatus. The server apparatus determines whether or not the monitored user operation information satisfies a predetermined condition, and when determining that the condition is satisfied, inserts the insertion information into a predetermined display position on the web page displayed on the terminal apparatus.

15 Claims, 9 Drawing Sheets

(58) Field of Classification Search
USPC .................................................. 715/234, 200
See application file for complete search history.

(56) References Cited

U.S. PATENT DOCUMENTS

| | | | | |
|---|---|---|---|---|
| 8,175,922 | B2* | 5/2012 | Jones et al. ................. | 705/14.73 |
| 8,307,392 | B2* | 11/2012 | Ahanger ................ | G06Q 30/02 |
| | | | | 725/32 |
| 8,887,085 | B1* | 11/2014 | Cox .................... | G06F 3/04855 |
| | | | | 715/786 |
| 9,792,385 | B2* | 10/2017 | Artz .................. | G06F 17/30902 |
| 2008/0201242 | A1* | 8/2008 | Minnis et al. .................. | 705/27 |
| 2010/0064250 | A1* | 3/2010 | Schroeder ............. | G06F 3/0485 |
| | | | | 715/784 |
| 2013/0238433 | A1* | 9/2013 | Kamdar ............. | G06Q 30/0241 |
| | | | | 705/14.53 |
| 2013/0271419 | A1* | 10/2013 | Sharma .................... | G06F 3/03 |
| | | | | 345/173 |
| 2014/0089787 | A1* | 3/2014 | Takami .................... | G06F 3/14 |
| | | | | 715/234 |
| 2017/0024098 | A1* | 1/2017 | Doherty ................ | G06F 3/0485 |

FOREIGN PATENT DOCUMENTS

| | | |
|---|---|---|
| JP | 2004-295267 A | 10/2004 |
| JP | 2007-047988 A | 2/2007 |
| JP | 2007233698 A | 9/2007 |
| JP | 2009-271735 A | 11/2009 |
| WO | 2009/001926 A1 | 12/2008 |

OTHER PUBLICATIONS

Japanese Patent Office Action dated Aug. 21, 2012 for JP 2009-268800 and English-language translation thereof.
International Preliminary Report on Patentability dated Mar. 1, 2011 for PCT/JP2010/070600 and English-language translation thereof.

* cited by examiner

SERVER APPARATUS, TERMINAL APPARATUS, METHOD FOR INSERTING INFORMATION INTO WEB PAGE, INFORMATION INSERTION PROGRAM, AND RECORDING MEDIUM WITH PROGRAM RECORDED THEREIN

CROSS REFERENCE TO RELATED APPLICATIONS

This application is a National Stage of International Application No. PCT/JP2010/070600 filed Nov. 18, 2010, claiming priority based on Japanese Patent Application Nos. 2009-268800 filed Nov. 26, 2009 and 2009-268803 filed Nov. 26, 2009, the contents of all of which are incorporated herein by reference in their entirety.

TECHNICAL FIELD

The present invention relates to a field of a technique of efficiently displaying information on a web page provided from a website on the Internet.

BACKGROUND ART

There are a great number of websites on the Internet, and various types of pieces of information are put on these websites. A user terminal connected to the Internet can access a website by specifying a URL (Uniform Resource Locator) of the website in a web browser, and display a web page provided from the website. By this means, a user of the user terminal can browse web pages provided from the website.

Further, a technique is known of automatically setting a link leading to a web page which displays related information, to allow the user to efficiently browse related information related to information displayed on the web page. For example, Patent Literature 1 discloses a technique of morphologically analyzing remark data acquired from a user terminal and, when a product name matches with a word included in the remark data, setting to this word a link to a product page for displaying product information matching this product name. This technique can more easily set a link to a product advertising page on a web page, and more effectively lead a user to click the link.

CITATION LIST

Patent Literature

Patent Literature 1: Japanese Patent Application Laid-Open No. 2004-295267

SUMMARY OF INVENTION

Technical Problem

Meanwhile, as described above, a technique of setting a link for displaying related information requires a user's operation of specifying a link to actually display this related information, and is complicated. Further, this link consistently leads to related information for a keyword extracted based on an analysis method such as morphological analysis, and, therefore, information is not necessarily displayed as intended by an operator of a web page which is being browsed. Furthermore, by specifying a link, a web page transitions or another window is opened, and therefore the user is required to perform complicated operations such as a browser transition operation of clicking "a back button and the like" to carefully read the web page and related information, an operation of selecting a tag of another browser and an operation of adjusting a display size of the browser, and is likely to psychologically hesitate to perform these operations. Hence, in many cases, displaying related information or detailed information in a single page is efficient.

However, when, from the first, the amount of information to be displayed in a web page is great for a user who has low interest in information of this web page, there is a problem that the user skips important information. By contrast, when, from the first, the amount of information to be displayed in a web page is little for a user who has high interest in information of this web page, there is a problem that the user takes labor of collecting related information or detailed information.

Further, conventional techniques have difficulty in determining in which information a user is interested among a plurality of pieces of information displayed in a web page. Particularly when information displayed in a web page is a movie and movie data of this movie is played back to the last, it is difficult to learn whether the user is interested in content of the movie or is not interested in the movie and left it.

In light of the above problems, it is an object of the present invention to provide a server apparatus, a terminal apparatus, a method of inserting information into a web page, an information insertion program and a recording medium with a program recorded therein which allow both of users who have low interest in information of a web page and users who have high interest in information of the web page to more efficiently browse information on the web page. Further, it is also an object of the present invention to provide a server apparatus, a terminal apparatus, a method of inserting information into a web page, an information insertion program and a recording medium with a program recorded therein which allow both of users who have low interest in content of a movie displayed on a web page and users who have high interest in content of the movie displayed on the web page to more efficiently browse information on the web page.

Solution to Problem

In order to solve the above problem, the invention according to claim 1 is a server apparatus which a terminal apparatus can access through a network, comprising:
transmitting means that transmits a web page to the terminal apparatus;
monitoring means that monitors user operation information for the web page displayed on the terminal apparatus;
condition determining means that determines whether or not the monitored user operation information satisfies a predetermined condition; and
inserting means that, when the condition determining means determines that the condition is satisfied, inserts insertion information into a predetermined display position on the web page displayed on the terminal apparatus.

The present invention allows both of users who have low interest in information of a web page and users who have high interest in information of the web page to more efficiently browse information on the web page.

The invention according to claim 2 is the server apparatus according to claim 1,
wherein the user operation information is scrolling operation speed of the displayed web page.

The present invention can quickly determine whether the user has high or low interest in information of the web page based on one user's scrolling operation.

The invention according to claim 3 is the server apparatus according to claim 1, wherein the user operation information is a number of times of user's operations such as scrolling, clicking, tapping or change of a display size of the displayed web page.

The present invention can accurately determine whether the user has high or low interest in information of the web page.

The invention according to claim 4 is the server apparatus according to claim 1, wherein the user operation information is an operation of stopping scrolling of the displayed web page.

The present invention can quickly determine whether the user has high or low interest in information of the web page based on one user's scroll stopping operation.

The invention according to claim 5 is the server apparatus according to claim 4, wherein the inserting means inserts the insertion information related to information displayed on a web page when the scrolling is stopped according to the scrolling stop operation.

The present invention allows the user to browse insertion information in which the user is more interested.

The invention according to claim 6 is the server apparatus according to any one of claims 1 to 5, further comprising memory means that stores a plurality of pieces of the insertion information, each of the pieces of insertion information being allocated a display order for displaying on the web page, wherein the inserting means sequentially inserts each of the pieces of insertion information based on the display order allocated to each of the pieces of insertion information.

The present invention can display insertion information according to a display order determined by an operator of the server apparatus.

The invention according to claim 7 is the server apparatus according to any one of claims 1 to 6, further comprising data type determining means that, when the condition determining means determines that the condition is satisfied, determines a data type of information currently displayed on the web page, wherein the inserting means selects the insertion information matching the determined data type from a plurality of the pieces of insertion information, and inserts the selected insertion information.

The present invention can display insertion information based on a data type which the user likes the best.

The invention according to claim 8 is the server apparatus according to claim 1 or 2, further comprising:

second transmitting means that transmits movie data to be displayed on the web page displayed on the terminal apparatus, to the terminal apparatus; and playback end detecting means that detects an end of playback of the movie data played back in the terminal apparatus, wherein the condition determining means determines whether or not a user's operation is performed within a predetermined time after the end of playback is detected by the playback end detecting means, based on the user operation information monitored by the monitoring means, and the inserting means inserts the insertion information when the condition determining means determines that the user operation is performed.

The present invention allows both of users who have low interest in content of a movie displayed on a web page and users who have high interest in content of the movie displayed on the web page to more efficiently browse information on the web page.

The invention according to claim 9 is the server apparatus according to claim 8, wherein the inserting means inserts the insertion information related to the movie data.

The present invention allows the user to browse insertion information which the user likes the best.

The invention according to claim 10 is a method of inserting information into a web page in a server apparatus which a terminal apparatus can access through a network, comprising:

a step of, at the server apparatus, transmitting a web page to the terminal apparatus;

a step of, at the server apparatus, monitoring user operation information for the web page displayed on the terminal apparatus;

a step of, at the server apparatus, determining whether or not the monitored user operation information satisfies a predetermined condition; and a step of, at the server apparatus, when determining that the condition is satisfied, inserting insertion information into a predetermined display position on the web page displayed on the terminal apparatus.

The invention according to claim 11 is an information insertion program causing a computer which a terminal apparatus can access through a network, to function as:

transmitting means that transmits a web page to the terminal apparatus;

monitoring means that monitors user operation information for the web page displayed on the terminal apparatus;

condition determining means that determines whether or not the monitored user operation information satisfies a predetermined condition; and inserting means that, when the condition determining means determines that the condition is satisfied, inserts insertion information into a predetermined display position on the web page displayed on the terminal apparatus.

The invention according to claim 12 is a recording medium with an information insertion program recorded therein which causes a computer which a terminal apparatus can access through a network, to function as:

transmitting means that transmits a web page to the terminal apparatus;

monitoring means that monitors user operation information for the web page displayed on the terminal apparatus;

condition determining means that determines whether or not the monitored user operation information satisfies a predetermined condition; and inserting means that, when the condition determining means determines that the condition is satisfied, inserts insertion information into a predetermined display position on the web page displayed on the terminal apparatus.

The invention according to claim 13 is a terminal apparatus which can access a server apparatus through a network, comprising:

first acquiring means that acquires a web page from the server apparatus;

second acquiring means that acquires insertion information which needs to be inserted into the web page from the server apparatus;

display means that displays the acquired web page;

monitoring means that monitors user operation information for the displayed web page;

condition determining means that determines whether or not monitored user operation information satisfies predetermined conditions; and inserting means that, when determining that the conditions are satisfied, inserts the insertion information into a predetermined display position on the displayed web page.

The invention according to claim 14 is a terminal processing program which causes a computer which can access a server apparatus through a network, to function as:

first acquiring means that acquires a web page from the server apparatus;

second acquiring means that acquires insertion information which needs to be inserted into the web page from the server apparatus;

display means that displays the acquired web page;

monitoring means that monitors user operation information for the displayed web page;

condition determining means that determines whether or not monitored user operation information satisfies predetermined conditions; and inserting means that, when determining that the condition is satisfied, inserts the insertion information into a predetermined display position on the displayed web page.

The invention according to claim 15 is a recording medium with a terminal processing program recorded therein which causes a computer which can access a server apparatus through a network, to function as:

first acquiring means that acquires a web page from the server apparatus;

second acquiring means that acquires insertion information which needs to be inserted into the web page from the server apparatus;

display means that displays the acquired web page;

monitoring means that monitors user operation information for the displayed web page;

condition determining means that determines whether or not monitored user operation information satisfies predetermined conditions; and inserting means that, when determining that the condition is satisfied, inserts the insertion information into a predetermined display position on the displayed web page.

Advantageous Effects of Invention

The present invention can decrease important information skipped by decreasing information to be presented for users who have low interest in information of a web page, and can reduce users' labor of collecting related information or detailed information by adding information to be presented for users who have high interest in information of the web page. Consequently, the present invention allows both of users who have low interest in information of a web page and users who have high interest in information of the web page to more efficiently browse information on the web page.

Further, the present invention can decrease information to be presented for users who have low interest in content of a movie displayed on a web page, and can reduce users' labor of collecting related information or detailed information by adding information to be presented for users who have high interest in content of the movie displayed on the web page. Consequently, the present invention allows both of users who have low interest in content of a movie displayed on a web page and users who have high interest in content of the movie displayed on the web page to more efficiently browse information on the web page.

DESCRIPTION OF EMBODIMENTS

Hereinafter, embodiments of the present invention will be described with reference to the drawings. The embodiments will be described where the present invention is applied to an information providing system.

First, a configuration and a schematic function of an information providing system S according to an embodiment of the present invention will be described using FIG. 1.

Figure 1:
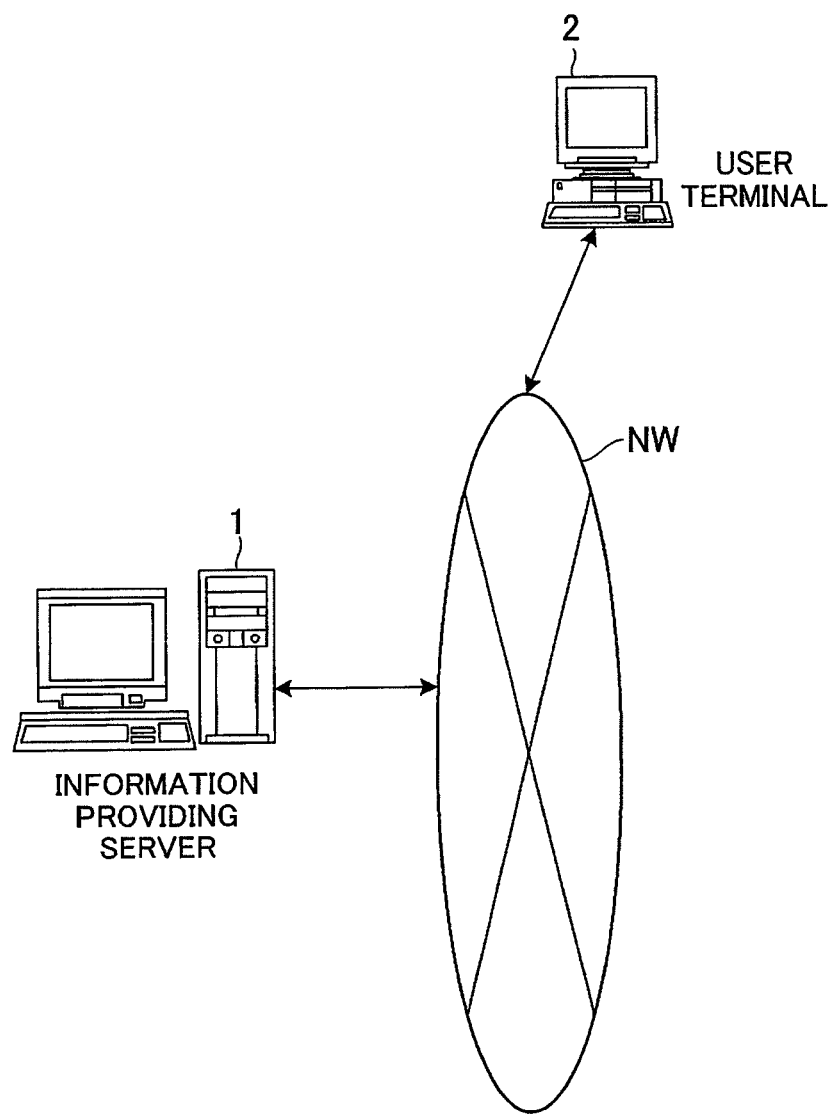
FIG. 1 is a view illustrating an example of a schematic configuration of an information providing system S according to the present embodiment.

FIG. 1 is a view illustrating an example of a schematic configuration of the information providing system S according to the present embodiment. As illustrated in FIG. 1, the information providing system S employs a configuration including an information providing server 1 (an example of a server apparatus), and a user terminal 2 (an example of a terminal apparatus) which can access the information providing server 1 through a network NW. Although FIG. 1 illustrates an example of one user terminal 2 for ease of description, there are multiple user terminals 2 per user.

The information providing server 1 and the user terminal 2 can transmit and receive data to and from each other using, for example, TCP/IP for a communication protocol through the network NW. The network NW is constructed with, for example, the Internet, dedicated communication lines (for example, CATV (Community Antenna Television) lines), a mobile communication network (including, for example, base stations) and a gate way.

With the information providing system S employing this configuration, the information providing server 1 is configured with such as a web server (or a web server and streaming server) installed to operate information providing websites which provide various pieces of information or services, for example. This information providing server 1 transmits a web page to the user terminal 2 according to a HTTP (Hyper Text Transfer Protocol) request from the user terminal 2. The user terminal 2 displays, for example, a received web page in a window screen which shows up on a display, using the web browser. The window screen is an active display area of a web browser, and, in case of full-screen display, the active display area is a full screen. Further, the display size of a window screen of a web browser can be changed by a user's operation.

On the web page displayed in this way, for example, content information configured with at least one of a text, a still image and a movie is displayed. Particularly, content information which shows, for example, an outline (minimum requisite information) of a product or service will be referred to as "basic content information". Further, when part of a display area of a web page does not settle in the window screen, the web browser of the user terminal 2 scrolls (moves) the display area of the web page in the window screen in a horizontal direction, a vertical direction or an oblique direction according to a user's scrolling operation of the displayed web page. One scrolling includes start of a scrolling operation to an end of the scrolling operation. Further, an end of the scrolling operation is detected when, for example, the scrolling operation is not performed in a predetermined time (for example, 0.5 seconds). The user's scrolling operation includes that, for example, the user rotates a wheel (a button between left and right buttons) of a mouse (an operation unit of the user terminal 2), the user moves a scroll bar displayed near the window screen by means of a drag function of the mouse, the user pushes an up, down, left or right arrow key of a keyboard (the operation unit of the user terminal 2), the user drags the window screen utilizing a pointing device such as the mouse and moves an active display area in an arbitrary direction and the user flicks (for example, lightly sweeps by the finger) the window screen of a touch panel type.

Further, in the present embodiment, when user operation information for a web page displayed on a window screen satisfies predetermined conditions, related information related to the basic content information, detailed information about the basic content information or the like are inserted into a predetermined display position on the web page.

An example of user operation information includes a scrolling operation speed at which a web page displayed in the window screen is scrolled according to the user's scrolling operation. Further, another example of user operation information includes the number of times of user's operations. This user's operation includes, for example, the scrolling operation, an operation of moving (using a mouse) a pointer displayed in the screen, approaching or contacting (by means of, for example, the user's finger or a pen) a display of the touch panel type, clicking, tapping and an operation of changing a display size of a window screen. "Clicking" generally refers to a user's operation of specifying a predetermined position (for example, a link) on a web page displayed in a window screen by means of a mouse. Further, "tapping" refers to a user's operation of specifying a predetermined position (for example, a link) on a web page displayed in a window screen of the touch panel type by means of such as the user's finger. Furthermore, an example of the operation of changing a display size of a window screen includes, for example, an operation of clicking (or tapping) a size change button (a button supporting, for example, deformation, enlargement and reduction) displayed near the window screen, dragging and shifting an end of the window screen and an operation of bringing closer or separating two fingers in contact with the window screen from one another.

Still further, related information related to basic content information includes, for example, recommended information for recommending other products related to a product shown in the basic content information. Moreover, detailed information about basic content information includes, for example, information which more specifically describes a product shown in the basic content information. Related information related to basic content information and detailed information about basic content information are "additional content information" (an example of insertion information).

Although additional content information is not displayed on a web page when user operation information for the web page does not satisfy predetermined conditions, basic content information is displayed on the web page irrespectively of a scrolling operation speed of the web page.

Further, in the present embodiment, when playback of movie data of a movie displayed on a web page is started and playback of this movie data ends, if a user's operation is performed within a predetermined time from the point of time when this playback ends, additional content information (an example of insertion information) is inserted into a predetermined display position on the web page. Additional content information in this case is, for example, related information related to movie data. This related information includes, for example, detailed information about a product or service shown in a movie of movie data, and recommended information for recommending other products and services related to the product or the service shown in this movie.

Next, a configuration and a function of the information providing server 1 will be described using FIG. 2.

Figure 2:
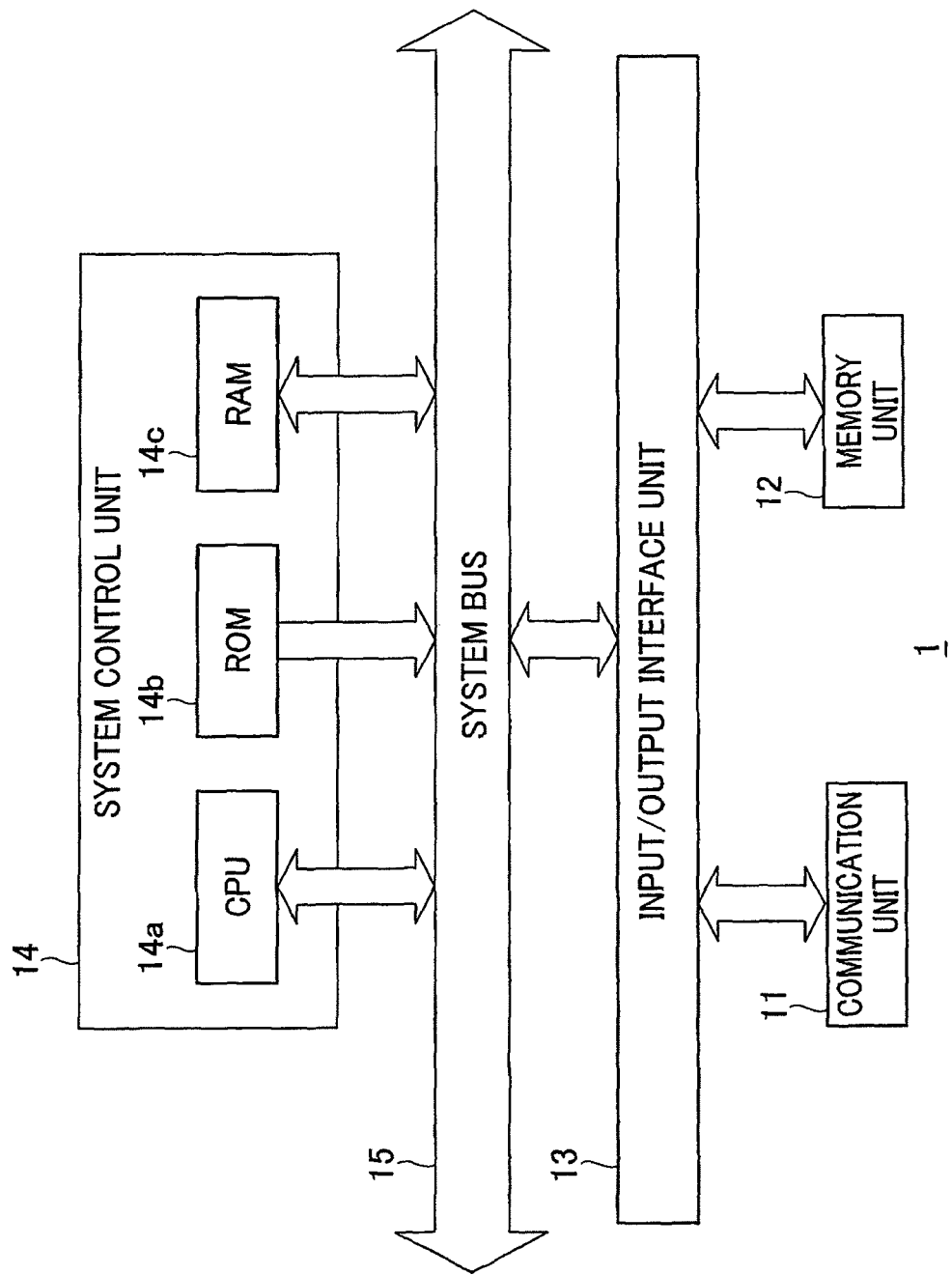
FIG. 2 is a block diagram illustrating an example of a schematic configuration of an information providing server 1 according to the present embodiment.

FIG. 2 is a block diagram illustrating an example of a schematic configuration of the information providing server 1 according to the present embodiment. As illustrated in FIG. 2, the information providing server 1 has a communication unit 11, a memory unit 12, an input/output interface unit 13 and a system control unit 14. Further, the system control unit 14 and the input/output interface unit 13 are connected through a system bus 15.

The communication unit 11 connects to the network NW, and controls a communication state with the user terminal 2.

The memory unit 12 employs a configuration including, for example, a hard disc drive, and stores various programs such as an operating system and an information providing program (including an information insertion program of the present invention). The information providing program according to the present invention may be, for example, acquired (downloaded) through the network NW from, for example, a predetermined server, or recorded in a recording medium such as a CD (Compact Disc) or a DVD (Digital Versatile Disc) and read through a drive unit 24.

Further, the memory unit 12 stores, for example, a structured document (for example, HTML (Hyper Text Markup Language) document or XHTML document)) file configuring a web page to be provided to the user terminal 2, an image (still image) file and a movie file.

The basic content information and additional content information displayed on a web page are prescribed by structured document. Further, basic content information and additional content information are, for example, classified into three data types of a text, a still image and a movie. When, for example, additional content information is a text, content and a data type of the additional content information are described in a tag (for example, <div> to </div>) in structured document. Further, when additional content information is a still image or a movie, a file name, a URL and a data type of the additional content information are described in a tag (for example, <div> to </div>) in structured document. Furthermore, basic content information and additional content information are each allocated a type of content (hereinafter, referred to as "content type"), and the content type is described in a tag (for example, <div> to </div>) in structured document. This content type includes, for example, a genre (category) of a product or service. A configuration may be employed where a structured document file which prescribes basic content information and a structured document file which prescribes additional content information are separate.

Further, in the structured document, a script (for example, JavaScript (registered trademark)) is described which monitors user operation information for a web page and inserts additional content information into a predetermined display position on the web page when the monitored user operation information satisfies predetermined conditions. These predetermined conditions prescribe that, for example, a scrolling operation speed is a predetermined value or less or is smaller than a predetermined value, or a total number of times of user's operations is a predetermined number of times or more or is greater than a predetermined number of times. The predetermined value is arbitrarily determined by, for example, an administrator, and is set between, for example, 5 cm and 10 cm/second. Further, the predetermined number of times is arbitrarily determined by, for example, an administrator and is set between, for example, three times and ten times.

Furthermore, in some cases, in the structured document, a script (for example, JavaScript (registered trademark)) is described which detects an end of playback of movie data played back in a web page, determines whether or not a user's operation is performed within a predetermined time after the end of playback is detected and, when determining that the user's operation is performed, inserts additional content information into a predetermined display position on the web page.

Still further, in some cases, a plurality of pieces of additional content information are prescribed in the structured document. In this case, when user operation information for a web page satisfies predetermined conditions, a selection criterion as to which additional content information to select from a plurality of pieces of additional content information is described in the script. This selection criterion prescribes, for example, selection of additional content information matching a data type of basic content information currently displayed in a window screen. When, for example, the data type of basic content information is a text, additional content information configured with a text is selected for additional content information matching this data type. Further, this selection criterion prescribes, for example, selection of additional content information having the same or different content type as or from a content type of basic content information currently displayed in a window screen. This selection criterion may prescribe random selection of one of a plurality of pieces of additional content information.

Further, when a plurality of pieces of additional content information are prescribed in the structured document, the script sequentially inserts each additional content information in a predetermined display position on a web page (for example, an image of adding <div> additional content information </div>) while a scrolling operation speed of the web page satisfies predetermined conditions. In this case, the display order (in other words, insertion order) for displaying additional content information on a web page may be determined at random by the web browser of the user terminal 2, or may be determined in advance by the system control unit 14 of the information providing server 1. When the display order is determined in advance by the system control unit 14, the determined display order is allocated to each additional content information, and the allocated display order is described in a tag of structured document together with the data type of additional content information. A plurality of pieces of additional content information may be prescribed in one structured document file or may be prescribed in separate structured document files.

Further, when a plurality of pieces of additional content information are prescribed in the structured document, if a user's operation is performed within a predetermined time after the end of playback is detected, a selection criterion as to which additional content information to select from a plurality of pieces of additional content information is in some cases described in the script. This selection criterion prescribes, for example, selection of additional content information having the same or different content type as or from a content type of movie data. This selection criterion may prescribe random selection of one of a plurality of pieces of additional content information.

The input/output interface unit 13 performs interface processing between the communication unit 11 and the memory unit 12, and the system control unit 14.

The system control unit 14 is formed with, for example, a CPU (Central Processing Unit) 14a, a ROM (Read Only Memory) 14b and a RAM (Random Access Memory) 14c. The system control unit 14 executes an information providing program while executing an operating system to function as, for example, transmitting means, second transmitting means, monitoring means, condition determining means, inserting means, data type determining means and playback end determining means according to the present invention, and perform the following processings. Further, the system control unit 14 generates a web page according to a HTTP request from the user terminal 2 and transmits the web page to the user terminal 2. Furthermore, the system control unit 14 reads movie data stored in a movie file from the memory unit 12 according to a streaming delivery request from the user terminal 2 which displays the web page, and delivers this movie data to the user terminal 2. Still further, the system control unit 14 determines the display order of additional content information according to an operator's command. For example, the display order is determined prioritizing additional content information configured with a text.

Figure 3:
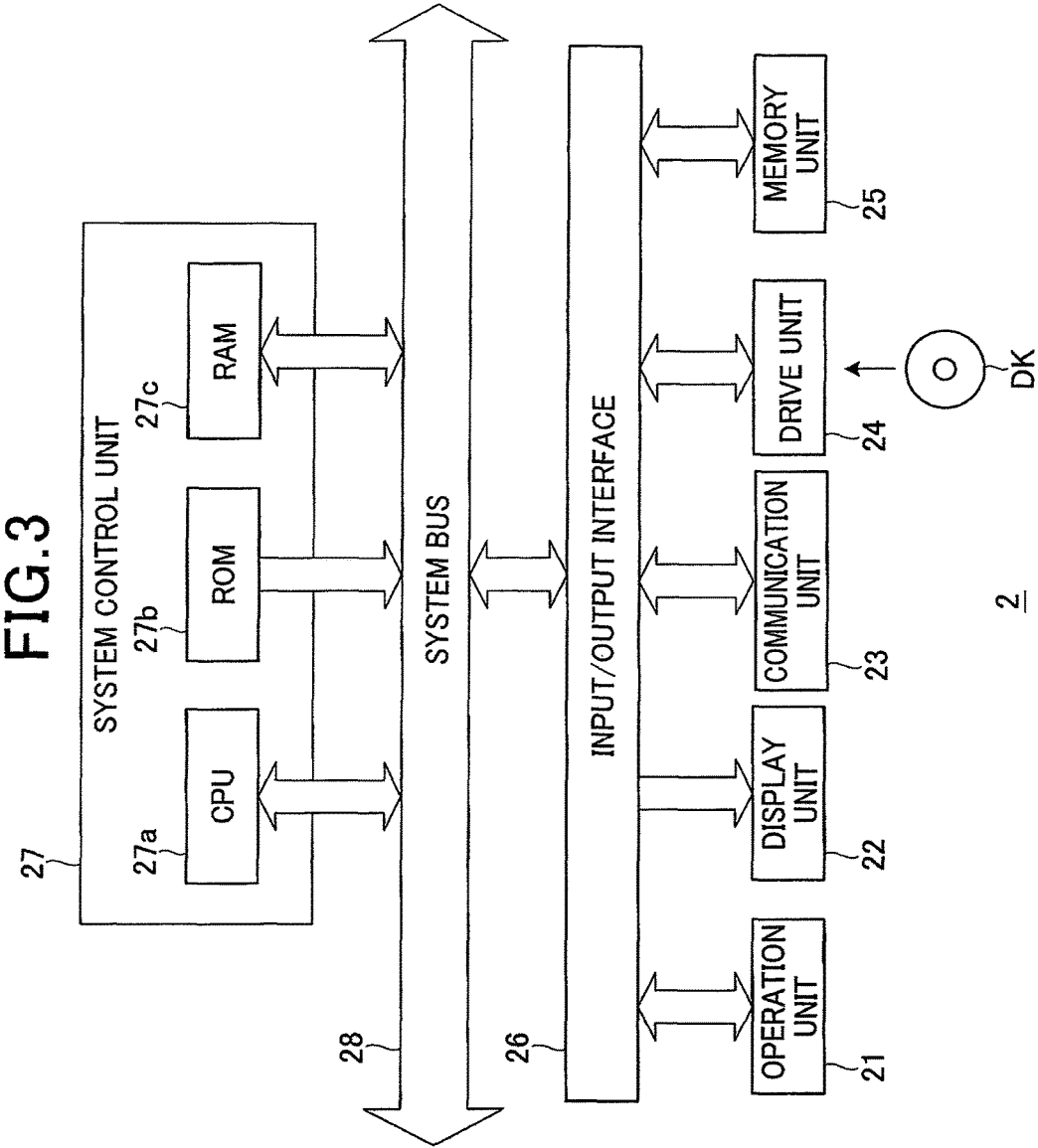
FIG. 3 is a block diagram illustrating a schematic configuration example of a user terminal 2.

Next, a configuration and a function of the user terminal 2 will be described using FIG. 3. FIG. 3 is a block diagram illustrating a schematic configuration example of the user terminal 2.

As illustrated in FIG. 3, the user terminal 2 has an operation unit 21, a display unit 22, a communication unit 23, a drive unit 24, a memory unit 25, an input/output interface unit 26 and a system control unit 27. Further, the system control unit 27 and the input/output interface unit 26 are connected through a system bus 28. For example, a personal computer, a PDA (Personal Digital Assistant) or a mobile telephone is applicable as the user terminal 2.

The operation unit 21 has, for example, a keyboard and a mouse.

The display unit 22 has a display for displaying, for example, web pages.

The communication unit 23 connects to the network NW, and controls a communication state with, for example, the information providing server 1.

The drive unit 24 reads, for example, data from, for example, a disc DK (an example of a recording medium) such as a CD or a DVD, and records, for example, data in this disc DK.

The memory unit 25 includes, for example, a hard disc drive, and stores, for example, an operating system (O/S) and a web browser program (including a terminal processing program of the present invention). The terminal processing program according to the present invention may be, for example, acquired (downloaded) from such as a predetermined server through the network NW, or may be recorded in a recording medium such as a CD or a DVD and read through the drive unit 24.

Next, the system control unit 27 has, for example, a CPU 27a, a ROM 27b and a RAM 27c. Further, the system control unit 27 executes a web browser program to activate the web browser while the CPU 27a executes an operating system after activating the web browser to function as first acquiring means, second acquiring means, display means, monitoring means, condition determining means, inserting means, playback end detecting means and data type determining means according to the present invention, and perform the following processings. A movie playback program such as Flash Player is plugged in the web browser, so that movie data displayed on a web page is acquired from the information providing server 1 and played back. That is, movie data (for example, Flash content) delivered from the information providing server 1 is received by the communication unit 23, and is streamed while being accumulated in a buffer area of the RAM 27c.

First Embodiment

Next, web page display processing according to the first embodiment will be described using FIG. 4.

Figure 4A:
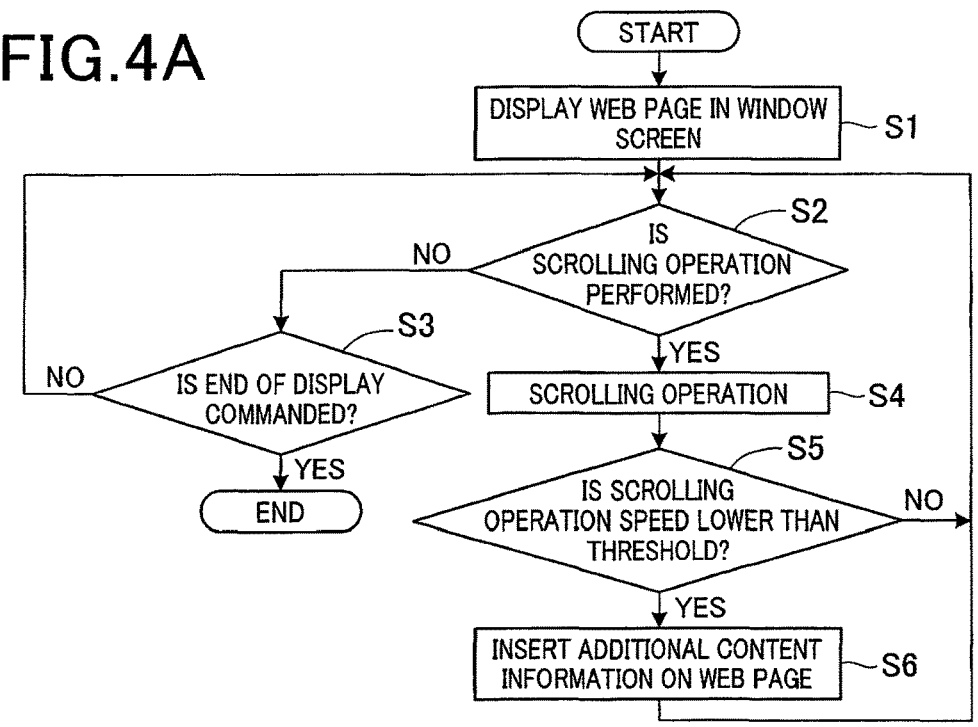
FIGS. 4A and 4B are flowcharts illustrating web page display processing according to the first embodiment.
Figure 4B:
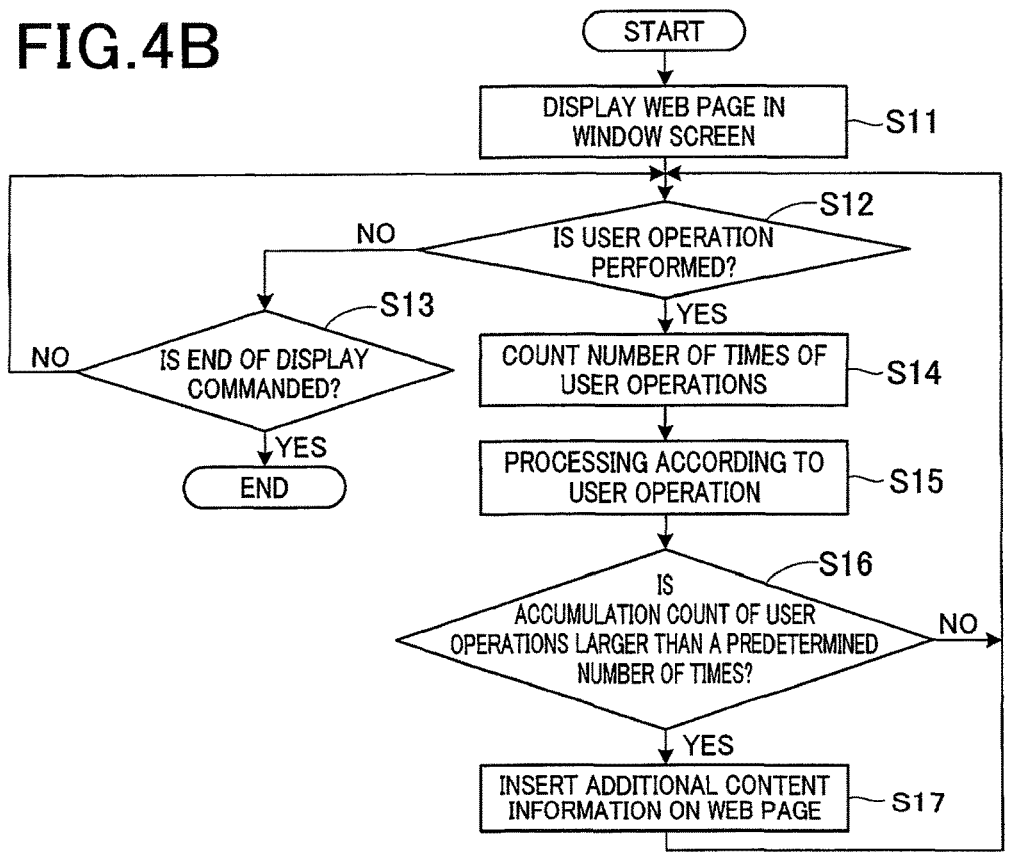

FIGS. 4A and B are flowcharts illustrating web page display processing according to the first embodiment, and FIG. 4A illustrates that a monitoring target is a scrolling operation speed and FIG. 4B illustrates that a monitoring target is the number of times of user's operations.

First, the web page display processing illustrated in FIG. 4A will be described. The web page display processing illustrated in FIG. 4A is started when the user terminal 2 activates the web browser, and receives and acquires data (such as a structured document file) configuring the web page returned from the information providing server 1 according to a HTTP request transmitted from the user terminal 2 to the information providing server 1. The basic content information and additional content information are included in the data configuring the acquired web page.

In the web page display processing illustrated in FIG. 4, the system control unit 14 of the information providing server 1 transmits a web page to the user terminal 2 and displays the web page on the web browser (step S1). That is, the system control unit 27 of the user terminal 2 displays the acquired web page in the window screen which shows up on the display of the display unit 22.

Next, in step S2, whether or not the scrolling operation is performed by the user through the operation unit 21 is determined by the system control unit 14 or the system control unit 27. Further, when it is determined that the scrolling operation is not performed (step S2: NO), whether or not an end of displaying the web page is commanded is determined (step S3). When, for example, the user clicks a button for closing a web page (or a back button) or clicks a hyperlink for jumping to another web page, it is determined that the end of displaying the web page is commanded. Further, when the end of display is commanded (step S3: YES), this processing ends, and, when the end of display is not commanded (step S3: NO), the step returns to step S2.

By contrast, when it is determined that the scrolling operation is performed (step S2: YES), the step proceeds to step S4.

In scroll processing illustrated in step S4, when the system control unit 27 scrolls a display area of a web page in the window screen according to a signal related to the scrolling operation, the system control unit 14 recognizes this scroll processing. When the web page is scrolled in this way, the scrolling operation speed is monitored by the system control unit 14 or the system control unit 27 according to, for example, a script described in structured document configuring the web page. The scrolling operation speed is a speed at which a display area of a web page moves. For example, a value obtained by dividing an amount (length) of displacement (movement) of a display area of a web page by the time this displacement (movement) takes is detected as the scrolling operation speed.

In step S5, whether or not the monitored scrolling operation speed is, for example, smaller than a predetermined value (prescribed in the script) is determined by the system control unit 14 or the system control unit 27 (step S5). The scrolling operation speed of a monitoring target may be an average value, a maximum value or a minimum value of the scrolling operation speed detected, for example, a plurality of times while a web page is scrolled, or a scrolling operation speed of the highest appearance frequency. Further, when it is determined that the scrolling operation speed is not smaller than a predetermined value (step S5: NO), the step returns to step S2 to repeat the same processing as the above. That is, when, for example, a web page is scrolled fast, the web page is scrolled to the lowermost end, and, for example, a payment button for purchasing a product is displayed.

By contrast, when it is determined that the scrolling operation speed is smaller than a predetermined value (step S5: YES), additional content information is inserted into, for example, a lower display position in the window screen on a web page (step S6). For example, the system control unit 14 has the system control unit 27 insert additional content information. That is, when, for example, a web page is slowly scrolled, that is, when the user carefully browses basic content information displayed on the web page, additional content information is inserted into a display position until the web page is scrolled to the lowermost end, and is displayed. The additional content information can be inserted in this way by, for example, describing in advance an empty tag (for example, between the tags <div> and </div> is left empty) in structured document configuring the web page, and, when user operation information satisfies predetermined conditions, changing (in other words, switching, substituting or replacing) the tag to a HTML tag in which the additional content information is prescribed. Alternatively, additional content information can be inserted by prescribing in advance the additional content information as a non-display layer in structured document configuring a web page and, when user operation information satisfies predetermined conditions, changing (in other words, switching) the non-display layer to a display layer.

Figure 5A:
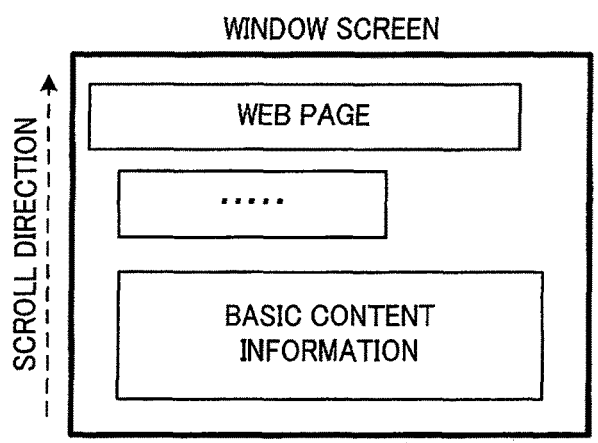
FIGS. 5A and 5B are views illustrating how additional content information is inserted into a web page.
Figure 5B:
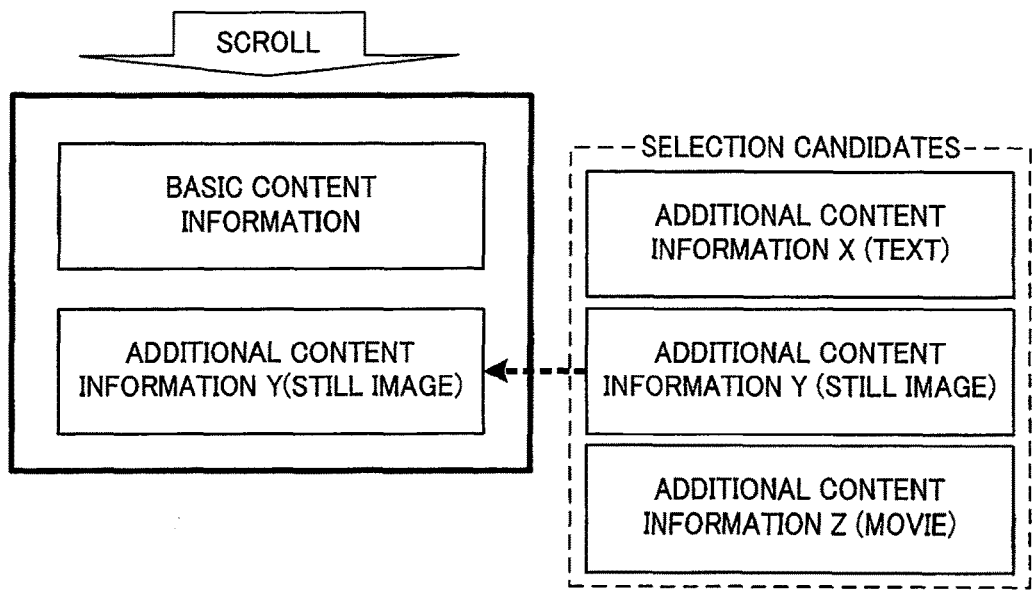

FIG. 5 illustrates that additional content information is inserted into a web page as described above.

With examples illustrated in FIGS. 5A and B, additional content information X is inserted into a lower position of basic content information.

In some cases, a selection criterion of selecting additional content information matching a data type of basic content information is described in a script described in structured document configuring a web page. In this case, when it is determined in step S5 that the scrolling operation speed is smaller than a predetermined value, the data type of basic content information currently displayed on the web page is determined by the system control unit 14 or the system control unit 27. Further, additional content information matching the determined data type is selected from a plurality of pieces of additional content information (selection candidates), and the selected additional content information is inserted into, for example, a lower display position in the window screen. When, for example, the data type of basic content information is a still image, in the example illustrated in FIG. 5, additional content information Y, the data type of which is a still image (that is, the data type matches with the basic content information), is selected among three pieces of additional content information X to Z. A slow scrolling operation speed when, for example, the basic content information configured with a still image is displayed means that the user is highly likely to like a still image. Consequently, it is possible to display additional content information of the data type which the user likes the best.

Further, when processing in step S6 ends, the step returns to step S2 to repeat the same processing as the above. When, for example, the scrolling operation continues, determination in step S5 is executed again and, when it is determined that the scrolling operation speed is smaller than a predetermined value, the next additional content information is inserted into, for example, a lower display position of the additional content information previously displayed in the window screen on the web page. Thus, when the scrolling operation continues and the scrolling operation speed is smaller than a predetermined value, additional content information is sequentially inserted. In some cases, a web page is a search result page provided from a search site. In this case, based on user operation information (when, for example, the scrolling operation speed is smaller than a predetermined value) for a search result page which displays as basic content information the search result including each record (that is, a record for which a snippet (which is an extraction of a text including a keyword) is displayed) from, for example, the top 1st to 100th, the search result including each record below the 101st is inserted as additional content information. This makes it possible to determine based on the scrolling speed whether or not the user reads information (for example, a snippet) related to each record from the top 1st to 100th and, when the scrolling speed is slow, regard that the user reads information related to each record, and, consequently, it is possible to more effectively display the search result including each record equal to or less than the next 101st.

Figure 6A:
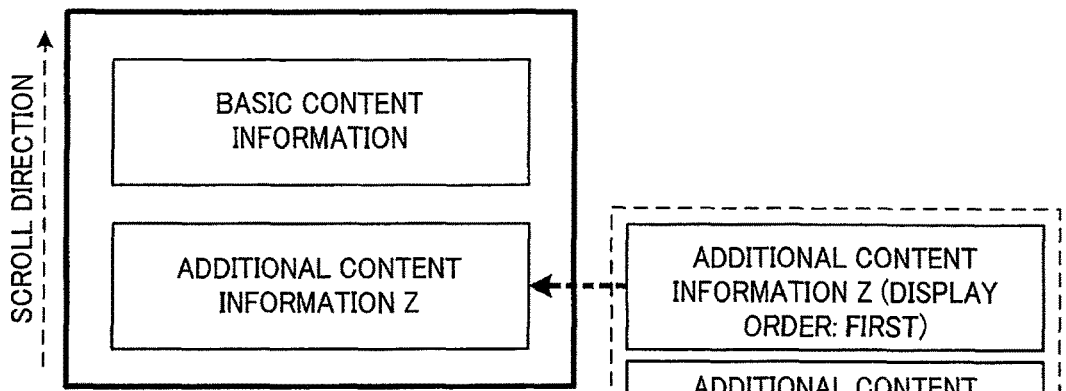
FIGS. 6A to 6C are views illustrating how a plurality of pieces of additional content information are sequentially inserted into a web page.
Figure 6B:
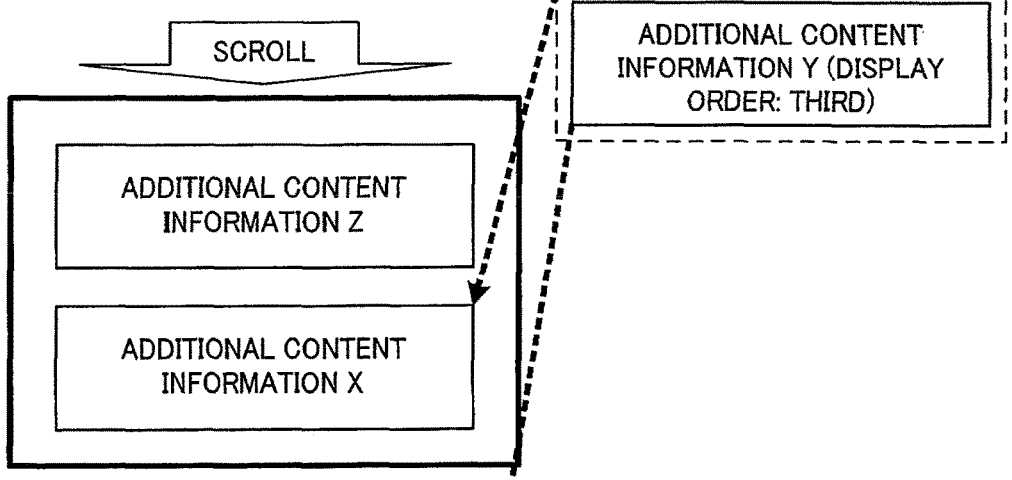
Figure 6C:
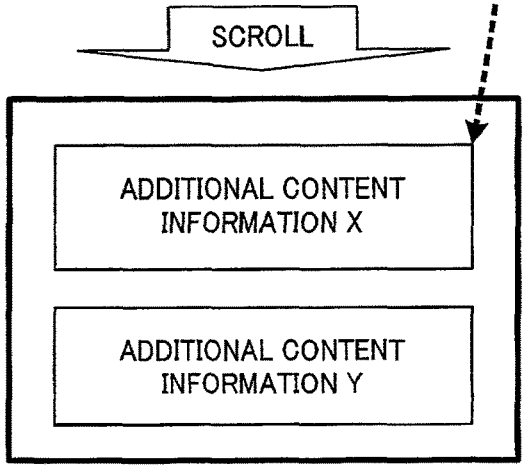

FIG. 6 is a view illustrating how a plurality of pieces of additional content information are sequentially inserted into a web page. With examples illustrated in FIGS. 6A to 6C, three pieces of the additional content information X to Z are sequentially inserted.

When the display order of each additional content information is described in structured document configuring a web page, each additional content information is sequentially inserted into, for example, a lower display position of the window screen based on the display order allocated to each additional content information. With the example illustrated in FIG. 6, the display order of the additional content information X is the 2nd, the display order of the additional content information Y is the 3rd and the display order of the additional content information Z is the 1st, so that these pieces of additional content information X to Z are inserted into the web page according to the display order of the additional content information Z, the additional content information X and the additional content information Y. This makes it possible to display additional content information according to the display order determined by the operator of the information providing server 1.

Although a timing to insert additional content information into a web page in the above processing is a timing when the scrolling operation speed is determined to be smaller than a predetermined value, another timing may be, for example, a timing when the scrolling operation ends (or when the scrolling operation starts) after it is determined that the scrolling operation speed is smaller than a predetermined value. Alternatively, a configuration may be employed where additional content information may be inserted into a web page at regular intervals after it is determined that the scrolling operation speed is smaller than a predetermined value.

Next, web page display processing illustrated in FIG. 4B will be described. In web page display processing illustrated in FIG. 4B, the same processing as in web page display processing illustrated in FIG. 4A will not be described.

In step S12 illustrated in FIG. 4B, whether or not one of the above user's operations is performed by the user through the operation unit 21 is determined by the system control unit 14 or the system control unit 27. When it is determined that the user's operation is not performed (step S12: NO), whether or not an end of displaying a web page is commanded is determined (step S13). When the end of display is commanded (step S13: YES), this processing ends, and the step returns to step S12 when the end of display is not commanded (step S13: NO).

By contrast, when it is determined that the user's operation is performed (the user's operation is detected) (step S12: YES), the number of times of user's operations is counted (for example, 1 is added to a variable x) (step S14). Although the user's operation includes, for example, a scrolling operation, clicking and tapping, the number of times of user's operations is counted regardless of which operations is performed.

Next, in step S15, processing matching the user's operation performed in step S12 is executed by the system control unit 27, and processing matching this user's operation is recognized by the system control unit 14.

Next, whether or not the total number (counted value) of times of monitored user's operations is larger than a predetermined number of times is determined by the system control unit 14 or the system control unit 27 (step S16) and, when the total number of times is not larger than a predetermined number of times (step S16: NO), the step returns to step S12 to repeat the same processing as the above.

By contrast, when the total number of times is larger than a predetermined number of times (step S16: YES), similar to step S6 illustrated in FIG. 4A, additional content information is inserted into a predetermined position in the window screen on the web page (step S17).

Meanwhile, a configuration may be employed where, when the user's operation such as a scrolling operation, clicking or tapping is performed in step S12, information showing the user's operation is transmitted to the information providing server 1. In this case, the information providing server 1 counts the number of times of user's operations from the user terminal 2, determines whether or not the total number of times (counted value) is larger than a predetermined number of times, and, when the total number of times is larger than a predetermined number of times, transmits additional content information to the user terminal 2. Further, the system control unit 27 of the user terminal 2 acquires the additional content information transmitted from the information providing server 1, and inserts the additional content information into the web page. A timing to transmit information showing the user's operation from the user terminal 2 to the information providing server 1 includes, for example, a timing when processing matching the user's operation ends, or a timing when the user's operation is detected the next time, per predetermined time (for example, one minute) or every time accumulation of a predetermined amount of data is detected.

As described above, a configuration is employed in the first embodiment where, when user operation information for a displayed web page is monitored and the monitored user operation information satisfies predetermined conditions, additional content information is inserted into a predetermined display position on the displayed web page, so that it is possible to decrease important information skipped by decreasing information to be presented for users who have low interest in information of the web page, and reduce users' labor of collecting related information or detailed information by adding information to be presented for users who have high interest in information of the web page. Consequently, it is possible to allow both of users who have low interest in information of a web page and users who have high interest in information of the web page to more efficiently browse information on the web page.

Further, according to a configuration of determining that the predetermined conditions are satisfied when the scrolling operation speed of the displayed web page is slow (for example, equal to or less than a predetermined value), it is possible to quickly determine whether has high or low interest in information of the web page based on one user's scrolling operation. Furthermore, according to a configuration of determining that the predetermined conditions are satisfied when the number of times of user's operations for the displayed web page is great (equal to or more than a predetermined number of times), it is possible to accurately determine whether the user has high or low interest in information of the web page.

Although additional content information is included in data configuring the web page acquired first in the above embodiment, a configuration may be employed as another example where the user terminal 2 acquires a structured document file which prescribes additional content information from the information providing server 1 (in other words, the information providing server 1 transmits a structured document file which prescribes additional content information to the user terminal 2) every time it is determined that user operation information satisfies predetermined conditions (for example, the scrolling operation speed is smaller than a predetermined value). In case of this configuration, for example, a URL of a structured document file which prescribes additional content information is described in a tag of the structured document which prescribes basic content information, the structured document file is acquired according to the URL and additional content information is inserted into the web page. Alternatively, a configuration may be employed where a URL of a web page which describes additional content information is described in a tag of structured document which prescribes basic content information, and the web page which describes additional content information is acquired from the information providing server 1 according to the URL (in other words, the information providing server 1 transmits the web page which describes additional content information to the user terminal 1) to display the web page on the window screen.

Further, although a configuration is employed in the above embodiment where additional content information is inserted into a lower display position in the window screen on the web page, a configuration may be employed where additional content information is substituted (dynamically changed) with basic content information displayed on the web page to insert this additional content information.

Furthermore, a configuration may be employed where, instead of sequentially inserting the additional content information X to Z as illustrated in FIGS. 6A to 6C, the additional content information X is inserted, the additional content information Y is next inserted (that is, substituted) instead of the additional content information X and the additional content information Z is then inserted instead of the additional content information Y.

Still further, although an example has been described with the above embodiment where a selection criterion of selecting additional content information is described in a script described in structured document configuring a web page, as another example, a selection criterion may include selecting additional content information in which the user has a high degree of interest (high interest level) which can be recognized by a scrolling operation. According this configuration, when, for example, basic content information displayed (that is, slowly scroll-displayed) upon, for example, determination that the scrolling operation speed is smaller than a predetermined value, is a specification of a product, additional content information having a more detailed specification is selected assuming that the user has high interest in the additional content information. Consequently, it is possible to display additional content information in which the user has high interest.

Further, as another example, a selection criterion may include selecting additional content information matching basic content information included in an active display area after an operation of changing (for example, deforming/enlarging/reducing) a display size of a window screen of a web browser. This makes it possible to display additional content information in which the user has high interest.

Further, as another example, a selection criterion may include selecting additional content information based on a web page browsing history of the user. According to this configuration, when, for example, the information providing server 1 accumulates a web page browsing history of the user of the user terminal 2, and it is determined that the scrolling operation speed of the web page transmitted to the user terminal 2 after the user logs in is smaller than a predetermined value, the information providing server 1 which has received this information from the user terminal 2 selects and transmits to the user terminal 2 additional content information in which the user has high interest, based on the web page browsing history of the user who has logged in. Consequently, it is possible to display additional content information in which the user has high interest.

Further, as another example, a selection criterion may include selecting additional content information based on collaborative filtering. According to this configuration, when, for example, the information providing server 1 accumulates preference information of many users, and it is determined that the scrolling operation speed of the web page transmitted to the user terminal 2 after the user logs in is smaller than a predetermined value, the information providing server 1 which has received this information from the user terminal 2 selects and transmits to the user terminal 2 additional content information, using information of other users having a similar preference to the user who has logged in. Consequently, it is possible to display additional content information which the user is expected to prefer.

Further, although a configuration example has been described where, in the structured document, a script is described which monitors user operation information for a web page and inserts additional content information into a predetermined display position on the web page when the monitored user operation information satisfies predetermined conditions, a configuration may be employed where this user operation information refers to an operation of stopping scrolling the displayed web page so as to be prescribed as predetermined conditions that the displayed web page is stopped being scrolled. Web page display processing according to this configuration will be described with reference to FIG. 7.

Figure 7:
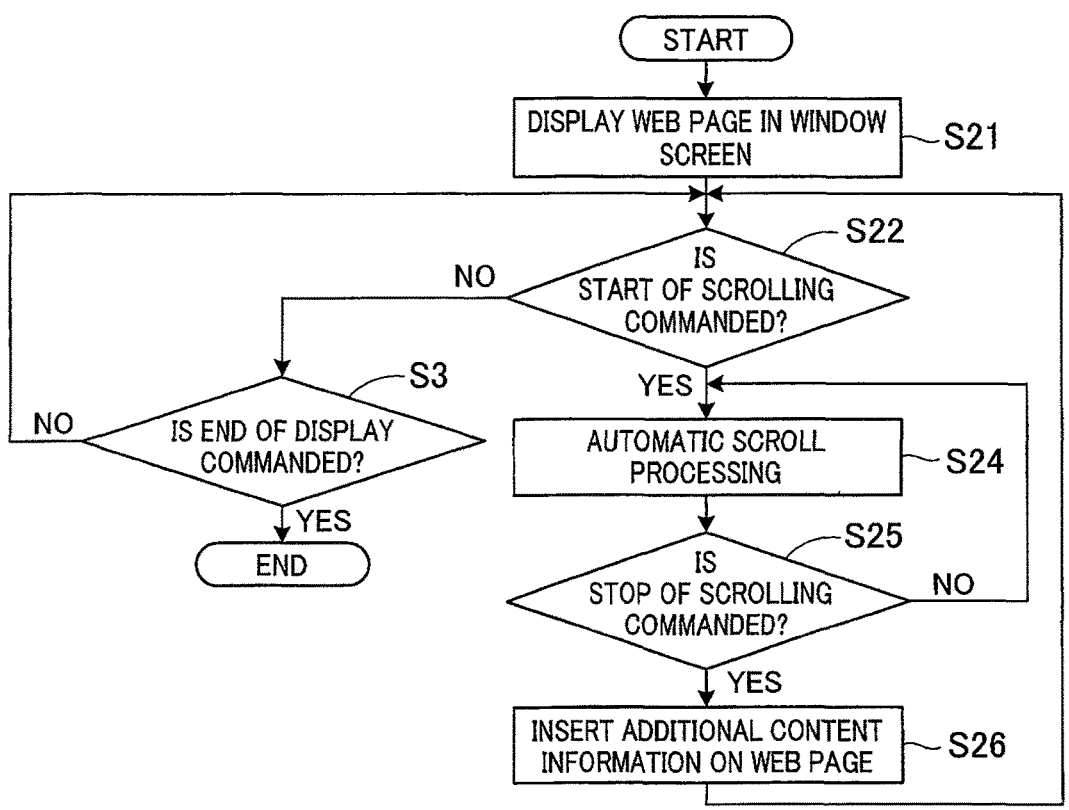
FIG. 7 is a flowchart illustrating web page display processing according to the first embodiment.

The same processing of the web page display processing illustrated in FIG. 7 as processing of the web page display processing illustrated in FIG. 4A will not be described.

In step S22 illustrated in FIG. 7, whether or not start of scrolling is commanded by the user through the operation unit 21 is determined by the system control unit 14 or the system control unit 27. When, for example, the user clicks a scroll start button displayed on a web page, using a mouse, it is determined that start of scrolling is commanded. Further, when it is determined that start of scrolling is not commanded (step S22: NO), the step proceeds to step S23 and, when it is determined that start of scrolling is commanded (step S22: YES), the system control unit 27 executes automatic scrolling processing (step S24). This automatic scrolling processing is performed according to, for example, a script of automatic scrolling described in structured document configuring a web page. Thus the display area of the web page is automatically scrolled (without any user's operations) in the window screen.

Next, whether or not stop of scrolling (an operation of stopping scrolling) is commanded by the user through the operation unit 21 is determined by the system control unit 14 or the system control unit 27 (step S25). When, for example, the user clicks a scroll stop button displayed on the web page, using a mouse (an arbitrary position on the window screen may be clicked), it is determined that stop of scrolling is commanded. Further, when it is determined that stop of scrolling is not commanded (step S25: NO), the step returns to step S24 to continue automatic scrolling processing, and, when it is determined that stop of scrolling is commanded (step S25: YES), automatic scrolling processing is stopped and the step proceeds to step S26.

Furthermore, in step S26, additional content information is inserted into a predetermined display position in the window screen on the web page, similarly to above step S6. For example, the system control unit 14 has the system control unit 27 insert additional content information. In this case, the system control unit 27 may as well transmit to the information providing server 1 coordinate information (for example, four vertex coordinates) for defining a display area of the web page displayed in the window screen when scrolling is stopped according to a scroll stop command.

Information displayed when automatic scrolling is stopped is estimated to be information in which the user has high interest.

Further, when receiving the coordinate information from the user terminal 2, the information providing server 1 specifies information (for example, content such as a text or a still image) arranged on a web page specified based on the coordinate information, one or a plurality of pieces of additional content information related to the specified information are acquired from a database, and these pieces of additional content information are transmitted to the user terminal 2. The acquired additional content information includes, for example, detailed information about a product or recommended information about a product similar to the product when, for example, the specified information is description or an image of a product.

When the user terminal 2 receives additional content information in this way, the additional content information is inserted into a predetermined display position in the window screen on the web page. According to this configuration, it is possible to quickly determine whether the user has high or low interest in information of the web page based on user's one scrolling operation, make the user browse additional content information in which the user is more interested (which is suitable for the user's interest) and realize personalization of a higher added value.

In this case, by employing a configuration where additional content information is inserted (sequentially inserted as illustrated in FIG. 6 when a plurality of pieces of additional content information are acquired) into a predetermined display position in a window screen on the web page when automatic scrolling of a web page is stopped and then scrolling is resumed according to a scroll start command from the user, it is possible to make the user more effectively browse additional content information. Further, although a case of automatic scrolling has been described in the above example, it may be determined in above step S25 that stop of scrolling is commanded when a scrolling operation is manually started and then scrolling is stopped for a predetermined period of time.

Second Embodiment

Next, web page display processing according to a second embodiment will be described using FIG. 8.

Figure 8:
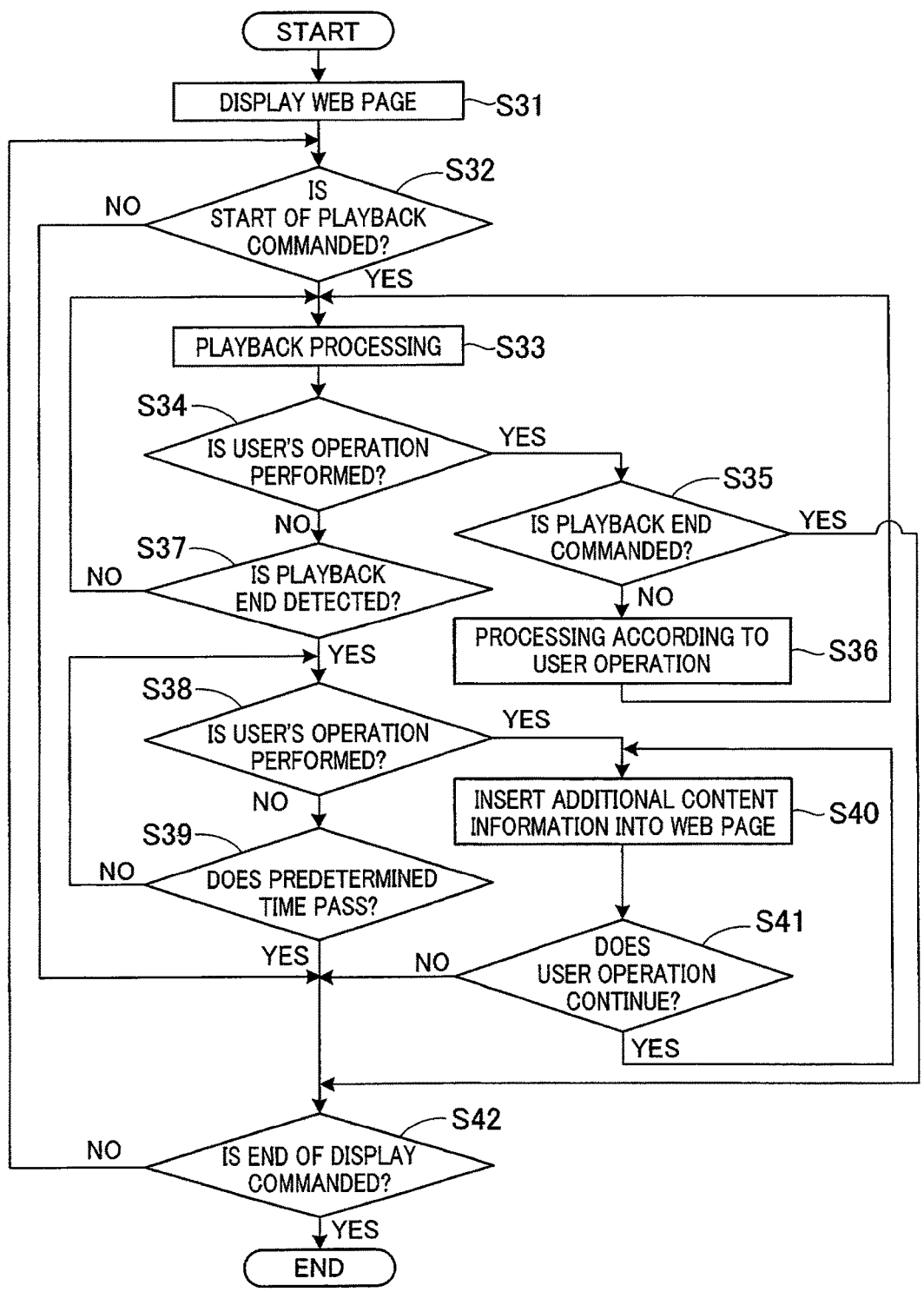
FIG. 8 is a flowchart illustrating web page display processing according to a second embodiment.

FIG. 8 is a flowchart illustrating web page display processing according to the second embodiment.

First, the web page display processing illustrated in FIG. 8 will be described. The web page display processing illustrated in FIG. 8 is started when the user terminal 2 activates the web browser, and receives and acquires data (such as a structured document file) configuring the web page returned from the information providing server 1 according to a HTTP request transmitted from the user terminal 2 to the information providing server 1. The additional content information is included in the data configuring the acquired web page.

With the web page display processing illustrated in FIG. 8, the system control unit 14 of the information providing server 1 transmits a web page to the user terminal 2 and has the web browser display the web page (step S31). That is, the system control unit 27 of the user terminal 2 displays the acquired web page in the window screen which shows up on the display of the display unit 22.

Next, in step S32, whether or not start of playback of movie data of a movie which needs to be displayed in a web page is commanded is determined by the system control unit 14 or the system control unit 27 (step S32). When, for example, the user clicks the playback start button provided in a display area of the movie embedded in the web page, it is determined that start of playback is commanded. The display of a web page may trigger determination that start of playback is commanded.

Further, when it is determined that start of playback is commanded (step S32: YES), the step proceeds to step S33, and, when it is determined that start of playback is not commanded (step S32: NO), the step proceeds to step S42.

In step S33, the system control unit 27 activates a movie playback program, and, when playback processing is performed, the system control unit 14 recognizes playback processing. With this playback processing, the system control unit 27 transmits a streaming delivery request to the information providing server 1, and plays back movie data while acquiring the movie data from the information providing server 1 (while downloading and accumulating the movie data in a buffer area). The movie (each frame) played back in this way is displayed on a web page.

Next, whether or not the user's operation is performed is determined by the system control unit 14 or the system control unit 27 (step S34). Further, when it is determined that the user's operation is performed (step S34: YES), the step proceeds to step S35, and, when it is determined that the user's operation is not performed (step S34: NO), the step proceeds to step S37.

In step S35, the system control unit 27 is determined whether or not the user's operation performed by the user is a playback stop command from the user is detected by the system control unit 14 or the system control unit 27. When, for example, the user clicks the playback stop button, when the user clicks a button for closing the web page (or a back button) or when the user clicks the hyperlink for jumping to another web page, it is determined that stop of playback is commanded.

Further, when it is determined that stop of playback is not commanded (step S35: NO), processing matching the user's operation (for example, temporary stop processing of movie data) is performed (step S36). By contrast, when it is determined that stop of playback is commanded (step S35: YES), playback of movie data is stopped and the step proceeds to step S42.

In step S37, whether or not an end of playback of movie data is detected is determined by the system control unit 14 or the system control unit 27. The end of playback of movie data is detected when playback of movie data is started (at a head time in a time-line), and is played back to the last (an end time in the time-line). Although an end of playback of movie data is detected even when playback of movie data is started, and the movie data is played back to the last via a user's skipping operation along the way (a movie in a certain period of time along the way is not displayed), a configuration may be employed where it is not determined that an end of playback of movie data is detected when this skipping operation is performed. According to this configuration, it is possible to skip presenting additional content information for the user who watches a movie for no reason (the user who is not so interested in content information of the movie).

Further, when an end of playback of movie data is not detected (step S37: NO), the step returns to step S33 to continue playback processing. By contrast, when the end of playback of movie data is detected (step S37: YES), for example, a script starts counting of a timer, and whether or not the user's operation is performed is determined by the system control unit 14 or the system control unit 27 (step S38). Although the user's operation in this case includes a scrolling operation, an operation of moving a pointer displayed on the screen and contacting a display of a touch panel type as described above, among these operations, performing the scrolling operation is suitable because it enables to easily insert additional content information and to sequentially insert additional content information as described below.

Further, when, for example, it is determined that a scrolling operation is not performed (step S38: NO), whether or not a predetermined time (for example, two seconds to five seconds) passes (for example, whether or not the timer is counted up) is determined (step S39). Furthermore, when it is determined that a predetermined time does not pass (step S39: NO), the step returns to step S38 to perform the same processing, and, when it is determined that a predetermined time passes (step S39: YES), the step proceeds to step S42. That is, according to this processing, whether or not, for example, the scrolling operation is performed within a predetermined time after the end of playback of movie data is determined by the system control unit 14 or the system control unit 27.

By contrast, in step S38, when, for example, it is determined that the scrolling operation is performed (step S38: YES), additional content information is inserted into, for example, a lower display position in the window screen on the web page (step S40).

As described above, additional content information is presented for the user under conditions that, for example, the scrolling operation is performed within a predetermined time after the end of playback of movie data is detected. This focuses on the point that, while it is possible to estimate based on the end of playback of movie data that the user is interested in a movie (assuming that it is possible to estimate that the user is not interested when playback does not continue to an end), it is possible to estimate based on passing of a predetermined time that the user does not browse (leaves) a web page.

The additional content information can be inserted by, for example, describing in advance an empty tag (which is, for example, between the tags <div> and </div> is left empty) in structured document configuring a web page, and, when a scrolling operation is performed, changing (in other words, switching, substituting or replacing) the tag to a HTML tag in which the additional content information is prescribed. Alternatively, additional content information can be inserted by prescribing in advance the additional content information as a non-display layer in structured document configuring a web page and, when user operation information satisfies predetermined conditions, changing (in other words, switching) the non-display layer to a display layer.

Next, whether or not the user operation continues (for example, an operation signal of the scrolling operation is continuously inputted) is determined by the system control unit 14 or the system control unit 27 (step S41), the step proceeds to step S42 when the user operation does not continue (step S41: NO), the step returns to step S40 when the user operation continues (step S41: YES) to insert next additional content information into, for example, a lower display position in the window screen on the web page. By this means, when, for example, the scrolling operation continues, a plurality of pieces of additional content information are sequentially inserted down to, for example, a payment button for purchasing a product in the lowermost end of the web page.

FIG. 9 is a view illustrating how additional content information is inserted after playback of movie data ends. Upon playback of movie data, as illustrated in FIG. 9A, a movie 51 is displayed on a web page P, and a playback bar 52 indicating a playback time (playback position) moves on a time-line bar 53 in a right direction as the time passes. Further, as illustrated in FIG. 9B, the playback bar 52 reaches to a right end of the time-line bar 53, and, when the scrolling operation is performed in a predetermined time after playback of movie data ends, the additional content information X is inserted and displayed on the web page P as illustrated in FIG. 9C. Furthermore, when the scrolling operation continues, the next additional content information Y is inserted and displayed on the web page P as illustrated in FIG. 9D.

Meanwhile, when the display order of each additional content information is described in structured document configuring a web page, each additional content information is sequentially inserted on the web page based on the display order allocated to each additional content information. FIG. 9 illustrates an example where the display order of the additional content information X is the 1st, and the display order of the additional content information Y is the 2nd. This makes it possible to display additional content information according to the display order determined by the operator of the information providing server 1.

Although, in the above processing, a timing to insert additional content information into a web page is a timing when, for example, the scrolling operation is performed, the insertion timing may be a timing "when the next user's operation is performed after the scrolling operation is performed and ends" or when "a predetermined time passes after the scrolling operation is performed and ends".

By contrast, in step S42, whether or not an end of displaying a web page is commanded is determined. Further, when the end of display is commanded (step S42: YES), this processing ends, and, when the end of display is not commanded (step S42: NO), the step returns to step S32. When, for example, the user clicks a button for closing a web page (or a back button) or clicks a hyperlink for jumping to another web page, it is determined that an end of displaying the web page is commanded.

As described above, a configuration is employed in the second embodiment where, when a user's operation is performed within a predetermined time after an end of playback of movie data of a movie displayed on a web page is detected, additional content information is inserted and displayed on the web page, so that it is possible to decrease information to be presented for users who have low interest in content of a movie displayed on the web page, and reduce users' labor of collecting related information or detailed information by adding information to be presented for users who have high interest in content of the movie displayed on the web page. Consequently, it is possible to allow both of users who have low interest in content of a movie displayed on a web page and users who have high interest in content of the movie displayed on the web page to more efficiently browse information on the web page.

Although, in the second embodiment, additional content information is included in data configuring the web page acquired first, a configuration may be employed as another example where, when the user operation is performed within a predetermined time after the end of playback of movie data is detected, the user terminal 2 acquires a structured document file which prescribes additional content information from the information providing server 1. In case of this configuration, for example, a URL of a structured document file which prescribes additional content information is described in a tag of the structured document, and the structured document file is acquired according to the URL and the additional content information is inserted into the web page. Alternatively, a configuration may be employed where a URL of a web page which describes additional content information is described in a tag of structured document, and the web page which describes the additional content information is acquired from the information providing server 1 according to the URL and is displayed in the window screen.

Further, although a configuration is employed in the second embodiment where additional content information is inserted into a lower display position in the window screen on a web page, a configuration may be employed where basic content information displayed on a web page is substituted (dynamically changed) with the additional content information to insert this additional content information.

Figure 9A:
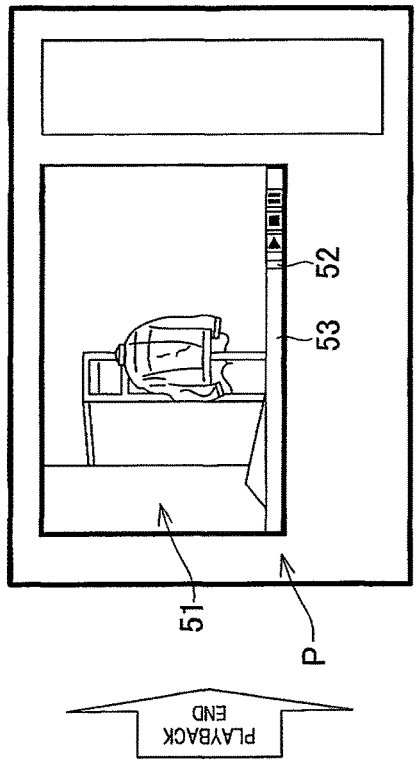
FIGS. 9A to 9D are views illustrating how additional content information is inserted after playback of movie data ends.
Figure 9B:
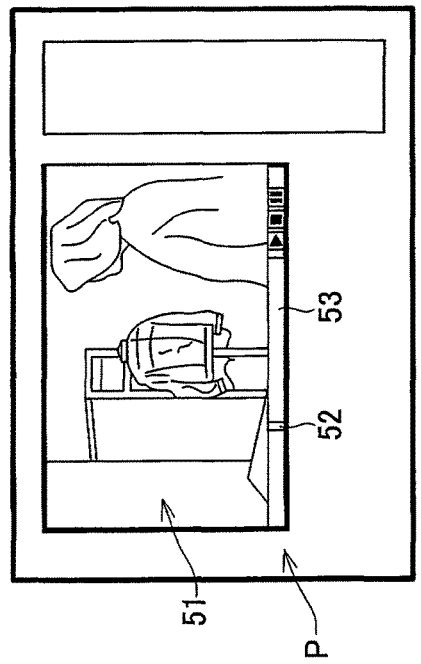
Figure 9C:
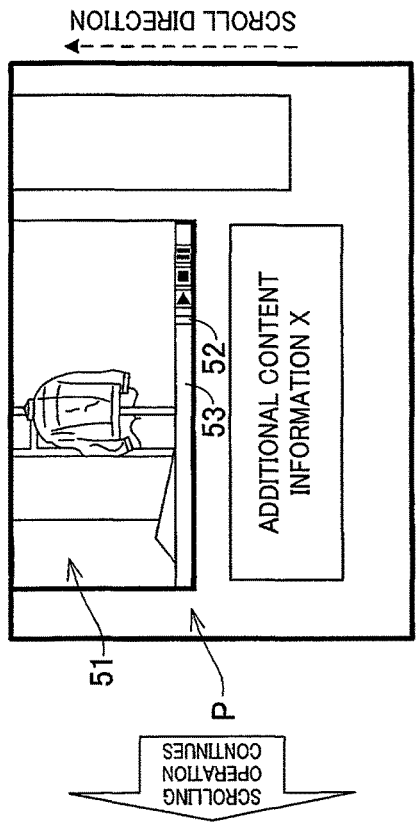
Figure 9D:
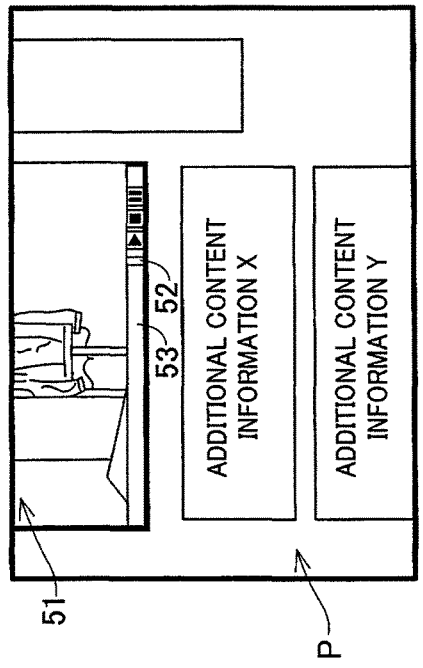

Furthermore, a configuration may be employed where, instead of sequentially inserting the additional content information X and Y as illustrated in FIGS. 9C and 9D, additional content information X is inserted, and the additional content information Y is then inserted (that is, substituted) instead of the additional content information X.

Still further, with another example, a selection criterion may include selecting additional content information based on a web page browsing history of the user. According to this configuration, for example, the information providing server 1 accumulates a web page browsing history of the user of the user terminal 2, and, after the user of the user terminal 2 logs in, the information providing server 1 then selects and transmits to the user terminal 2 additional content information in which the user has high interest, based on the web page browsing history of the user who has logged in. Consequently, it is possible to display additional content information in which the user has high interest.

REFERENCE SIGNS LIST

1 INFORMATION PROVIDING SERVER
2 USER TERMINAL
11 COMMUNICATION UNIT
12 MEMORY UNIT
13 INPUT/OUTPUT INTERFACE UNIT
14 SYSTEM CONTROL UNIT
15 SYSTEM BUS
21 OPERATION UNIT
22 DISPLAY UNIT
23 COMMUNICATION UNIT
24 DRIVE UNIT
25 MEMORY UNIT
26 INPUT/OUTPUT INTERFACE UNIT
27 SYSTEM CONTROL UNIT
28 SYSTEM BUS
NW NETWORK
S INFORMATION PROVIDING SYSTEM

The invention claimed is:

1. A method performed by a system, which includes a server apparatus and a terminal apparatus that are communicable through a network,
each of the server apparatus and the terminal apparatus comprising at least one memory operable to store program code, and at least one processor operable to read the program code and operate as instructed by the program code, and
the method, based on the program code executed by the at least one processor of at least one of the server apparatus and the terminal apparatus, performing:
displaying, on the terminal apparatus, at least a part content which is displayed in a display area of the terminal apparatus, among a basic content included in a Web page obtained from the server apparatus;
scrolling the at least a part content displayed in the display area in accordance with a scrolling operation;
when it is determined that a speed of the scrolling operation satisfies a predetermined condition, inserting an additional content, different from the basic content, obtained from the server apparatus into the Web page, and performing the scrolling with respect to the Web page in which the additional content has been inserted; and when it is determined that the speed of the scrolling operation does not satisfy the predetermined condition, performing the scrolling with respect to the Web page in which the additional content has not been inserted, while the basic content being scrolled is displayed during the scrolling.

2. The method according to claim 1, wherein the predetermined condition is that the speed of the scrolling operation is equal to or less than a threshold.

3. The method according to claim 1, wherein the determining comprises counting a number of a preset user operation being performed and determining whether the counted number of the preset user operation is equal to or greater than a threshold; and the method further comprises inserting the additional content when it is determined that the counted number of the preset user operation is equal to greater than the threshold.

4. The method according to claim 3, wherein the preset user operation comprise at least two of the scrolling operation, a clicking operation, a tapping operation and an operation of changing a display size of the displayed at least a part content.

5. The method according to claim 1, further comprising:
when it is determined that the predetermined condition is satisfied, determining a data type of the at least a part content currently displayed on the Web page, the data type including a first data type, and a second data type different from the first data type;
selecting, from a plurality of additional contents, an additional content having the first data type in response to the determined first data type of the at least a part content and the additional content having the second data type in response to the determined second data type of the at least a part content; and
inserting the selected content.

6. The method according to claim 1, further comprising:
detecting an end of playback of a movie played back in the terminal apparatus, the movie which is currently displayed on the Web page,
determining whether the scrolling operation is performed within a predetermined time after the end of playback is detected.

7. The method according to claim 6,
wherein the additional content is related to the movie.

8. The method according to claim 1, wherein the method further performs obtaining, before displaying the at least a part content, an entire portion of the Web page from the server apparatus.

9. The method according to claim 1, wherein the inserting the additional content comprises:
in response to the scrolling operation being performed toward a lowest end portion of the Web page, inserting the additional content between a lower portion of the basic content in the Web page and the lowest end portion of the Web page.

10. The method according to claim 1, further comprising:
specifying information that is displayed on the terminal apparatus, among the basic content, when it is determined that the speed of the user operation satisfies the predetermined condition,
wherein the additional content is related to the specified information.

11. A server apparatus which is communicable with a terminal apparatus through a network, the server apparatus comprising:
at least one memory operable to store program code; and
at least one processor operable to read the program code and operate as instructed by the program code, and the program code comprising:
transmitting code configured to cause the at least one processor to transmit a Web page including a basic content to the terminal apparatus; and
determining code configured to cause the at least one processor to, when at least a part content which is displayed in a display area of the terminal apparatus, among the basic content, determine whether a scrolling operation that satisfies a predetermined condition is performed with respect to the at least a part content, wherein
when it is determined that a speed of the scrolling operation satisfies a predetermined condition, additional content, different from the basic content, is inserted into the Web page, and the scrolling is performed with respect to the Web page in which the additional content has been inserted, and
when it is determined that the speed of the scrolling operation does not satisfy the predetermined condition, the additional content is not inserted, and the scrolling is performed with respect to the Web page in which the additional content has not been inserted, while the basic content being scrolled is displayed during the scrolling.

12. The server apparatus according to claim 11,
further comprising a memory that stores a plurality of pieces of additional content, each of the plurality of pieces of additional content being allocated a display order for displaying on the Web page,
wherein it is determined that the predetermined condition is satisfied, each of the plurality of pieces of additional content is sequentially inserted based on the display order allocated to each of the plurality of pieces of additional content.

13. A method performed by a system, which includes a server apparatus and a terminal apparatus that are communicable through a network,
each of the server apparatus and the terminal apparatus comprising at least one memory operable to store program code, and at least one processor operable to read the program code and operate as instructed by the program code, and
the method, performed based on the program code executed by the at least one processor of at least one of the server apparatus and the terminal apparatus, comprising:
displaying, on the terminal apparatus, a Web page obtained from the server apparatus;
detecting an end of playback of a video content played back in the terminal apparatus, the video content being currently displayed on the Web page, and starting counting of a timer in response to detection of the end of the playback of the video content;
determining whether a user's scrolling operation for scrolling the Web page is performed prior to completion of the counting of the timer; and
inserting an additional content, related to the video content and obtained from the server apparatus, at a position outside the video content on the Web page, based on a determination that the user's scrolling operation is performed prior to the completion of the counting of the timer.

14. The method according to claim 13, wherein the inserting comprises inserting the additional content, related to the video content and obtained from the server apparatus, at the position outside the video content on the Web page, based on a determination that the user's scrolling operation is performed within a predetermined time after the end of the playback is detected and prior to the completion of the counting of the timer, and further based on a determination that the user's scrolling operation is not performed during the playback of the video content.

15. The method according to claim 13, the method further comprising not inserting the additional content based on a determination that the user's scrolling operation is not performed until the counting of the timer is completed.

* * * * *